United States Patent
Chaulagain et al.

(10) Patent No.: US 11,130,843 B2
(45) Date of Patent: Sep. 28, 2021

(54) METHODS OF MANUFACTURE OF POLYETHERIMIDES

(71) Applicant: SABIC GLOBAL TECHNOLOGIES B.V., Bergen op Zoom (NL)

(72) Inventors: Mani Raj Chaulagain, Evansville, IN (US); Thomas Link Guggenheim, Mt Vernon, IN (US); Roy Ray Odle, Mt Vernon, IN (US)

(73) Assignee: SHPP GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 16/564,619

(22) Filed: Sep. 9, 2019

(65) Prior Publication Data

US 2019/0390013 A1    Dec. 26, 2019

Related U.S. Application Data

(62) Division of application No. 15/980,180, filed on May 15, 2018, now Pat. No. 10,457,778, which is a (Continued)

(51) Int. Cl.
*C08G 73/10* (2006.01)

(52) U.S. Cl.
CPC ..... *C08G 73/1032* (2013.01); *C08G 73/1046* (2013.01); *C08G 73/1021* (2013.01); *C08G 73/1064* (2013.01)

(58) Field of Classification Search
CPC .... C08G 73/107; C08G 73/1003; C08G 8/02; C07C 37/66; C07G 1/02; C07D 401/00
See application file for complete search history.

(56) References Cited

U.S. PATENT DOCUMENTS

| | | |
|---|---|---|
| 3,852,242 A | 12/1974 | White |
| 4,202,993 A | 5/1980 | Takekoshi |

(Continued)

FOREIGN PATENT DOCUMENTS

| | | |
|---|---|---|
| CN | 1073071 C | 10/2001 |
| CN | 1367192 A | 9/2002 |

(Continued)

OTHER PUBLICATIONS

International Search Report for International Application No. PCT/US2015/025948, Application filing date Apr. 15, 2015; dated Aug. 24, 2015, 4 pages.

(Continued)

*Primary Examiner* — Shane Fang
(74) *Attorney, Agent, or Firm* — Cantor Colburn LLP

(57) ABSTRACT

A method of manufacture of a polyetherimide composition includes contacting a substituted phthalic anhydride and an organic diamine in the presence of diphenyl sulfone, sulfolane, or a combination comprising at least one of the foregoing solvents at a temperature of greater than 130° C. to provide a bis(phthalimide) composition comprising diphenyl sulfone, sulfolane, or a combination comprising at least one of the foregoing solvents and a bis(phthalimide); and polymerizing the bis(phthalimide) and an alkali metal salt of a dihydroxy aromatic compound in the presence of diphenyl sulfone, sulfolane, or a combination comprising at least one of the foregoing to form a polyetherimide. The method does not require any catalyst either for the imidization or the polymerization.

15 Claims, 1 Drawing Sheet

Related U.S. Application Data division of application No. 15/304,102, filed as application No. PCT/US2015/025948 on Apr. 15, 2015, now abandoned.

(60) Provisional application No. 61/979,713, filed on Apr. 15, 2014.

(56) References Cited

U.S. PATENT DOCUMENTS

| | | | |
|---|---|---|---|
| 4,410,735 | A | 10/1983 | Dellacoletta et al. |
| 4,492,806 | A | 1/1985 | Mediratta et al. |
| 4,546,207 | A | 10/1985 | Mendiratta et al. |
| 4,870,155 | A | 9/1989 | Matzner et al. |
| 5,229,482 | A | 7/1993 | Brunelle |
| 5,266,679 | A | 11/1993 | Perry et al. |
| 5,514,813 | A | 5/1996 | Brunelle |
| 5,663,275 | A | 9/1997 | Schmidhauser |
| 5,830,974 | A | 11/1998 | Schmidhauser et al. |
| 5,856,421 | A | 1/1999 | Schmidhauser |
| 5,908,915 | A | 6/1999 | Brunelle |
| 6,066,743 | A | 5/2000 | Nick et al. |
| 6,096,900 | A | 8/2000 | Nick et al. |
| 6,235,866 | B1 | 5/2001 | Khouri et al. |
| 6,265,521 | B1 | 7/2001 | Fyvie et al. |
| 6,849,706 | B1 | 2/2005 | Brunelle et al. |
| 6,906,168 | B2 | 6/2005 | Khouri et al. |
| 6,919,418 | B2 | 7/2005 | Khouri et al. |
| 7,115,785 | B2 | 10/2006 | Guggenheim et al. |
| 7,125,954 | B2 | 10/2006 | Guggenheim et al. |
| 7,481,959 | B2 | 1/2009 | Richards et al. |
| 7,605,222 | B2 | 10/2009 | Ye et al. |
| 7,705,190 | B2 | 4/2010 | Brunelle |
| 7,714,095 | B2 | 5/2010 | Brunelle et al. |
| 7,902,407 | B2 | 3/2011 | Silva et al. |
| 7,981,996 | B2 | 7/2011 | Khouri et al. |
| 8,357,773 | B1 * | 1/2013 | Gallucci ............ C08G 73/1064 528/480 |
| 9,777,118 | B2 | 10/2017 | Chaulagain et al. |
| 2005/0049439 | A1 | 3/2005 | Guggenheim et al. |
| 2005/0272957 | A1 | 12/2005 | Gao et al. |
| 2006/0135741 | A1 | 6/2006 | Gui et al. |
| 2006/0173158 | A1 | 8/2006 | Brunelle et al. |
| 2006/0194070 | A1 * | 8/2006 | Groll ............ C08J 5/18 428/473.5 |
| 2008/0119660 | A1 | 5/2008 | Khouri et al. |
| 2009/0163691 | A1 | 6/2009 | Bernabe et al. |
| 2011/0263791 | A1 | 10/2011 | Chiong et al. |
| 2013/0053489 | A1 * | 2/2013 | Gallucci ............ C08K 5/13 524/128 |
| 2013/0108851 | A1 | 5/2013 | Kuhlman et al. |
| 2014/0099510 | A1 | 4/2014 | Chiong et al. |
| 2017/0029374 | A1 | 2/2017 | Chaulagain et al. |
| 2017/0029568 | A1 | 2/2017 | Chaulagain |
| 2017/0029569 | A1 | 2/2017 | Chaulagain et al. |

FOREIGN PATENT DOCUMENTS

| | | |
|---|---|---|
| CN | 1396194 A | 2/2003 |
| CN | 1560113 A | 1/2005 |
| CN | 1563150 A | 1/2005 |
| CN | 1803888 A | 7/2006 |
| CN | 101235009 A | 8/2008 |
| CN | 101531758 A | 9/2009 |
| CN | 101628977 A | 1/2010 |
| CN | 101704950 A | 5/2010 |
| CN | 101735022 A | 6/2010 |
| CN | 103159593 A | 6/2013 |
| DE | 2335687 A1 | 2/1975 |
| DE | 4129546 C1 | 4/1993 |
| EP | 0117459 B1 | 9/1989 |
| EP | 0857710 A1 | 8/1998 |
| EP | 2233512 B1 | 3/2013 |
| GB | 2280183 A | 1/1995 |
| JP | S63159332 A | 7/1988 |
| RO | 107949 B1 | 1/1994 |
| WO | 2011082147 A1 | 7/2011 |

OTHER PUBLICATIONS

Shang et al, "One-Pot Synthesis of Polyetherimides from Bis(chlorophthalimide) and Dichlorodiphenylsulfone in Diphenylsulfone", Journal of Applied Polymer Science, vol. 102, 2006, pp. 4584-4588.

Written Opinion for International Application No. PCT/US2015/025948, Application filed Apr. 15, 2015; dated Aug. 24, 2015, 7 pages.

* cited by examiner

METHODS OF MANUFACTURE OF POLYETHERIMIDES

CROSS REFERENCE TO RELATED APPLICATIONS

This application is a division of U.S. application Ser. No. 15/980,180, filed May 15, 2018, which is a division of U.S. application Ser. No. 15/304,102, filed Oct. 14, 2016, which is a National Stage application of PCT/US2015/025948, filed Apr. 15, 2015, which claims the benefit of U.S. Provisional Application No. 61/979,713, filed Apr. 15, 2014, the contents of all of which are incorporated herein by reference in their entirety.

BACKGROUND

This disclosure relates to methods of manufacture of polyetherimide compositions.

Polyetherimides ("PEIs") are amorphous, transparent, high performance polymers having a glass transition temperature ("Tg") of greater than 180° C. PEIs further have high strength, heat resistance, modulus, and broad chemical resistance, and therefore are widely used in applications as diverse as automotive, telecommunication, aerospace, electrical/electronics, transportation, and healthcare. One process for the manufacture of polyetherimides is by polymerization of alkali metal salts of dihydroxyaromatic compounds, such as bisphenol A disodium salt ("BPANa$_2$"), with a substituted bis(phthalimide) such as a bis(halophthalimide). For example, polyetherimides can be produced by polymerization of BPANa$_2$ with 1,3-bis[N-(4-chlorophthalimido)]benzene ("4-ClPAMI"), which has the following structure.

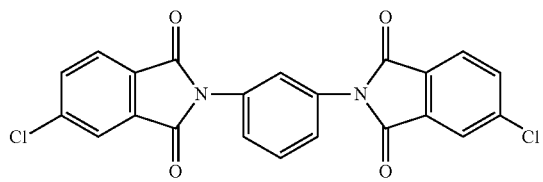 [SMILES: O=C1c2ccc(Cl)cc2C(=O)N1c1cccc(N2C(=O)c3ccc(Cl)cc3C2=O)c1]

Other isomers of the ClPAMI can also be present. Substituted bis(phthalimides) such as bis(halophthalimide)s, in turn, can be produced by imidization of a substituted or halophthalic anhydride such as 3-chlorophthalic anhydride ("3-ClPA"), 4-chlorophthalic anhydride ("4-ClPA"), or mixtures thereof with an organic diamine such as m-phenylenediamine ("mPD") or p-phenylenediamine ("pPD").

The polymerization is typically carried out between a dialkali salt of a bisphenol with a bis(halophthalimide) in an aromatic solvent in the presence of a polymerization catalyst. Attempts have been made to produce polyetherimides without using any catalyst to lower the manufacturing costs of the polymer. However, such processes require the purification and isolation of the substituted intermediate bis (phthalimide), which is cumbersome and not desirable in a commercial setting.

Thus there remains a need in the art for an improved process for the manufacture of polyetherimides that does not require a polymerization catalyst. It would be a further advantage if a substituted bis(phthalimide) can be made and used directly in the displacement polymerization without isolation and purification.

SUMMARY

A method for the manufacture of a polyetherimide composition comprises: contacting a substituted phthalic anhydride and an organic diamine in the presence of diphenyl sulfone or sulfolane or a combination comprising at least one of the foregoing solvents at a temperature of greater than 130° C., wherein the substituted phthalic anhydride has a formula

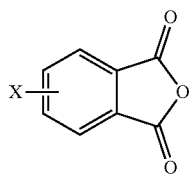

and the organic diamine has a formula H$_2$N—R—NH$_2$, to provide a bis(phthalimide) composition comprising diphenyl sulfone or sulfolane or a combination comprising at least one of the foregoing solvents and a bis(phthalimide) of the formula

and polymerizing the bis(phthalimide) and an alkali metal salt of a dihydroxy aromatic compound of the formula MO—Z—OM in the presence of diphenyl sulfone, sulfolane, a combination comprising at least one of the foregoing solvents to form a polyetherimide of the formula

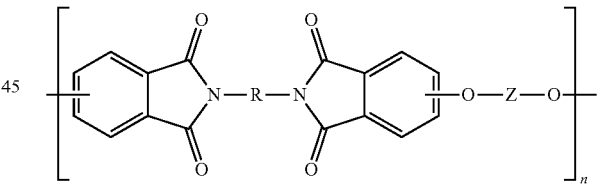

wherein in the foregoing formulae X is fluoro, chloro, bromo, iodo, nitro, or a combination comprising at least one of the foregoing; R is an aromatic hydrocarbon group having 6 to 27 carbon atoms, a halogenated derivative thereof, a straight or branched chain alkylene group having 2 to 10 carbon atoms, a halogenated derivative thereof, a cycloalkylene group having 3 to 20 carbon atoms, a halogenated derivative thereof, —(C$_6$H$_{10}$)$_z$— wherein z is an integer from 1 to 4, an aromatic hydrocarbyl moiety having from 1 to 6 aromatic groups, and a divalent group of the formula

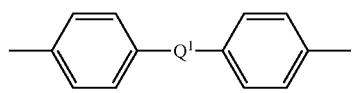

wherein $Q^1$ is —O—, —S—, —C(O)—, —SO$_2$—, —SO—, —C$_y$H$_{2y}$— wherein y is an integer from 1 to 5, or a combination comprising at least one of the foregoing; M is an alkali metal; Z is an aromatic C$_{6-24}$ monocyclic or polycyclic moiety optionally substituted with 1 to 6 C$_{1-8}$ alkyl groups, 1 to 8 halogen atoms, or a combination comprising at least one of the foregoing; and n is an integer greater than 1.

In another embodiment, a method for the manufacture of a polyetherimide composition comprises: contacting a substituted phthalic anhydride and an organic diamine in the presence of diphenyl sulfone, sulfolane, or a combination comprising at least one of the foregoing solvents at a temperature of 130° C. to 250° C., wherein the substituted phthalic anhydride has a formula

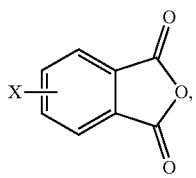

and the organic diamine has a formula H$_2$N—R—NH$_2$, to provide a bis(phthalimide) composition comprising diphenyl sulfone, sulfolane, or a combination comprising at least one of the foregoing solvents and a bis(phthalimide) of the formula

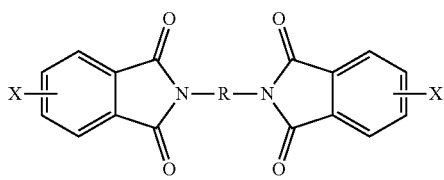

and polymerizing the bis(phthalimide) and a disodium salt or a dipotassium salt of bisphenol A in the presence of diphenyl sulfone, sulfolane, or a combination comprising at least one of the foregoing solvents to form a polyetherimide of the formula

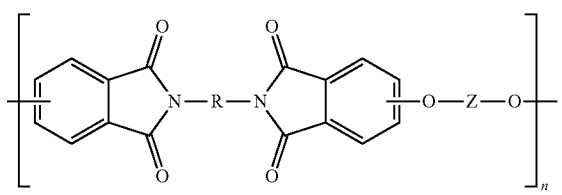

wherein in the foregoing formulae X is chloro; R is m-phenylene, p-phenylene, p,p-diphenylether, or 4,4'-diphenylsulfone; Z is

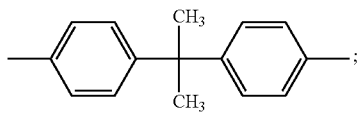

and n is an integer greater than 1.

Also disclosed is a polyetherimide composition manufactured by the methods of the disclosure Still further disclosed is a polyetherimide composition wherein the polyetherimide has a structure of the formula

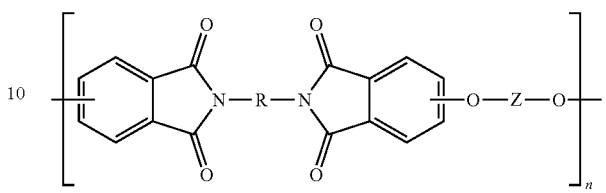

wherein R is an aromatic hydrocarbon group having 6 to 27 carbon atoms, a halogenated derivative thereof, a straight or branched chain alkylene group having 2 to 10 carbon atoms, a halogenated derivative thereof, a cycloalkylene group having 3 to 20 carbon atoms, a halogenated derivative thereof, —(C$_6$H$_{10}$)$_z$— wherein z is an integer from 1 to 4, an aromatic hydrocarbyl moiety having from 1 to 6 aromatic groups, and a divalent group of the formula

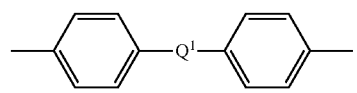

wherein $Q^1$ is —O—, —S—, —C(O)—, —SO$_2$—, —SO—, —C$_y$H$_{2y}$— wherein y is an integer from 1 to 5, or a combination comprising at least one of the foregoing; and Z is an aromatic C$_{6-24}$ monocyclic or polycyclic moiety optionally substituted with 1 to 6 C$_{1-8}$ alkyl groups, 1 to 8 halogen atoms, or a combination comprising at least one of the foregoing; and n is an integer greater than 1; wherein the composition comprises one or more of greater than 0.1 parts per million of diphenyl sulfone, sulfolane, or a combination comprising at least one of the foregoing, or greater than 1 part per million of sodium or potassium, or a yellowness index of less than 300.

BRIEF DESCRIPTION OF THE DRAWINGS

A description of the figures, which are meant to be exemplary and not limiting, is provided in which.

DETAILED DESCRIPTION

Figure 1:
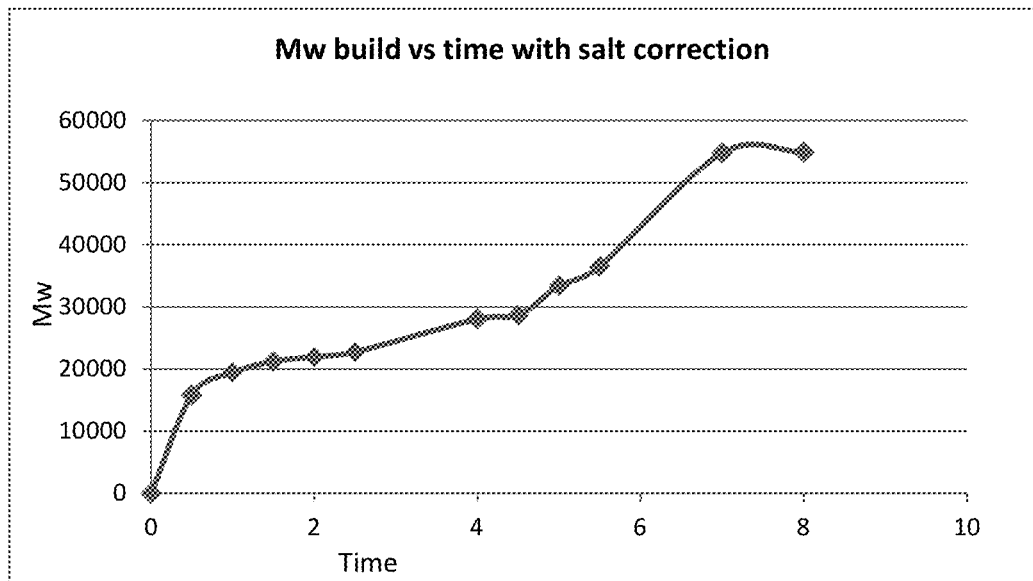
FIG. 1 is a graph of Mw of polyetherimide as a function of polymerization time.

The inventor hereof has surprisingly found that it is now possible to make substituted bis(phthalimide)s in polar aprotic solvents having a high boiling point, for example, diphenyl sulfone, or tetramethylene sulfone without using any imidization catalyst. The prepared substituted bis(phthalimide)s in polar aprotic solvents can be used directly in displacement polymerization without separating it from the polar aprotic solvents. In an advantageous feature, no polymerization catalyst is required for the polymerization.

Polyetherimides produced by the methods disclosed herein are of formula (1)

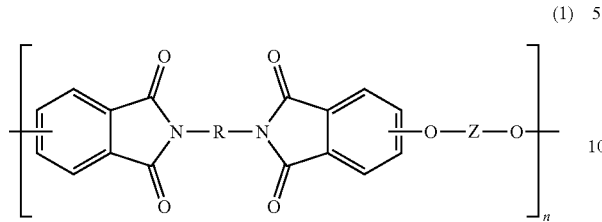

wherein n is greater than 1, for example 10 to 1,000, specifically 10 to 500, or 10 to 100, preferably 10 to 50.

The group R in formula (1) is a $C_{6-27}$ aromatic hydrocarbon group or a halogenated derivative thereof, a straight or branched chain $C_{2-20}$, specifically $C_{2-10}$ alkylene group or a halogenated derivative thereof, a $C_{3-20}$ cycloalkylene group or halogenated derivative thereof, $—(C_6H_{10})_z—$ wherein z is an integer from 1 to 4, an aromatic hydrocarbyl moiety having from 1 to 6 aromatic groups, and a group of formula (2)

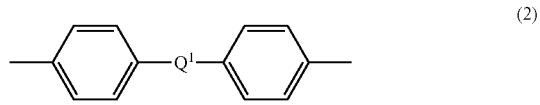

wherein $Q^1$ is $—O—$, $—S—$, $—C(O)—$, $—SO_2—$, $—SO—$, $—C_yH_{2y}—$ wherein y is an integer from 1 to 5, or a combination comprising at least one of the foregoing.

In an embodiment R is $—(C_6H_{10})_z—$ wherein z is an integer from 1 to 4 or a divalent group of formulae (3)

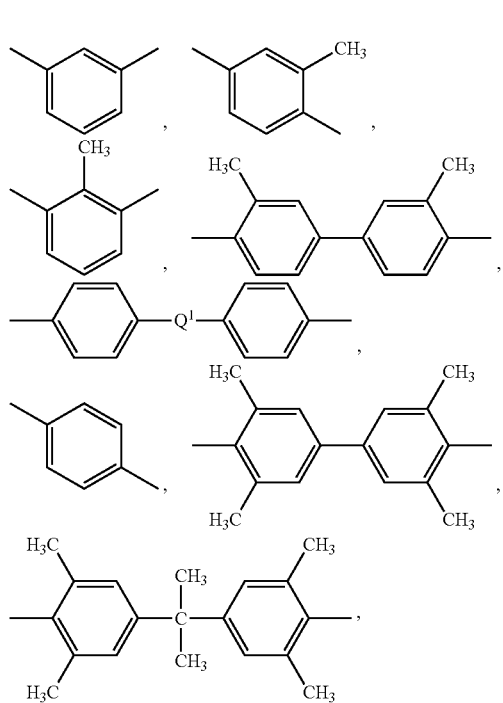

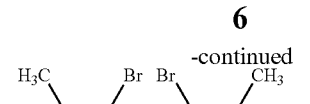

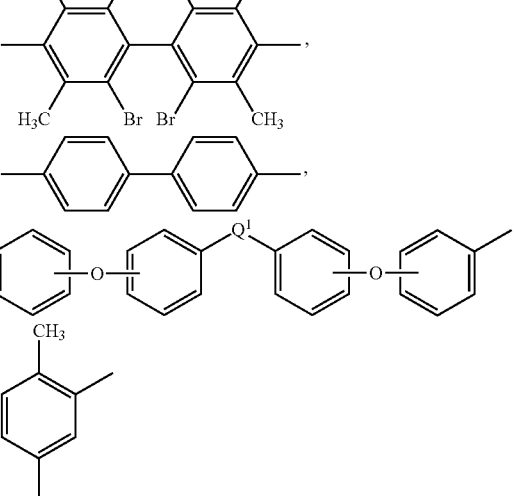

wherein $Q^1$ is $—O—$, $—S—$, $—C(O)—$, $—SO_2—$, $—SO—$, $—C_yH_{2y}—$ wherein y is an integer from 1 to 5, or a combination comprising at least one of the foregoing. In some embodiments, R is the diether aromatic moiety of formula (3) having four phenylene groups wherein $Q^1$ is a direct bond, $—O—$, $—S—$, $—C(O)—$, $—SO_2—$, $—SO—$, $—C_yH_{2y}—$ wherein y is an integer from 1 to 5. In some embodiments R is m-phenylene, p-phenylene, or a diaryl ether such as p,p-diphenylether, or a diarylsulfone such as 4,4'-diphenylsulfone. Embodiments where R is a divalent arylene ether can also be specifically mentioned, for example an arylene ether of the formula

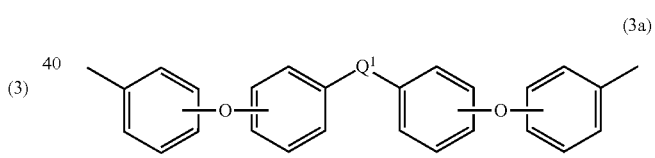

wherein $Q^1$ is a direct bond, $—O—$, $—S—$, $—C(O)—$, $—SO_2—$, $—SO—$, $—C_yH_{2y}—$ wherein y is an integer from 1 to 5, or a combination comprising at least one of the foregoing. In an embodiment, $Q^1$ in formula (3a) is $—O—$.

The group Z in formula (1) is a substituted or unsubstituted divalent organic group, and can be an aromatic $C_{6-24}$ monocyclic or polycyclic moiety optionally substituted with 1 to 6 $C_{1-8}$ alkyl groups, 1 to 8 halogen atoms, or a combination thereof, provided that the valence of Z is not exceeded. Exemplary groups Z include groups of formula (4):

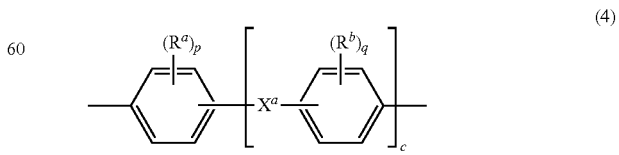

wherein $R^a$ and $R^b$ are each independently a halogen atom or a monovalent hydrocarbon group and can be the same or different; p and q are each independently integers of 0 to 4; c is 0 to 4, specifically zero or 1; and $X^a$ is a bridging group connecting the two aromatic groups, where the bridging group and point of attachment of each $C_6$ arylene group are disposed ortho, meta, or para (specifically para) to each other on the $C_6$ arylene group. The bridging group $X^a$ can be a single bond, —O—, —S—, —S(O)—, —S(O)$_2$—, —C(O)—, or a $C_{1-18}$ organic bridging group. The $C_{1-18}$ organic bridging group can be cyclic or acyclic, aromatic or non-aromatic, and can further comprise heteroatoms such as halogens, oxygen, nitrogen, sulfur, silicon, or phosphorous. The $C_{1-18}$ organic group can be disposed such that the $C_6$ arylene groups connected thereto are each connected to a common alkylidene carbon or to different carbons of the $C_{1-18}$ organic bridging group. A specific example of a group Z is a divalent group of formula (4a)

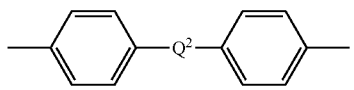
(4a)

wherein $Q^2$ is a single bond, —O—, —S—, —C(O)—, —SO$_2$—, —SO—, —C$_y$H$_{2y}$— and a halogenated derivative thereof wherein y is an integer from 1 to 5, including perfluoroalkylene groups. In a specific embodiment $Q^2$ is 2,2-isopropylidene, such that is Z is of formula (4b).

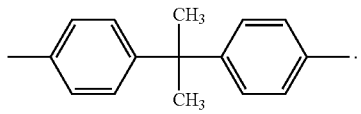
(4b)

In another specific embodiment $Q^2$ is a single bond.

In another specific embodiment, the polyetherimide comprises more than 1, specifically 10 to 100, 10 to 80, or 10 to 50 structural units, of formula (1) wherein R is a divalent group of formula (2) wherein $Q^1$ is —C$_y$H$_{2y}$— wherein y is an integer from 1 to 5, and Z is a group of formula (4a) wherein $Q^2$ is —O—, —S—, —C(O)—, —SO$_2$—, —SO—, or —C$_y$H$_{2y}$— or a halogenated derivative thereof wherein y is an integer from 1 to 5. In some embodiments, R is m-phenylene, p-phenylene, p,p-diphenylether, 4,4'-diphenylsulfone, or a combination comprising at least one of the foregoing, and Z is 2,2-(4-phenylene)isopropylidene. In some embodiments, the polyetherimide is a polyetherimide sulfone. A specific polyetherimide sulfone comprises structural units of formula (1) wherein at least 50 mole percent of the R groups are of formula (4a) wherein $Q^2$ is —SO$_2$— and the remaining R groups are independently p-phenylene or m-phenylene or a combination comprising at least one of the foregoing; and Z is 2,2-(4-phenylene)isopropylidene.

The polyetherimides are prepared first by imidization of a substituted phthalic anhydride with an organic diamine to form a bis(phthalimide), followed by polymerization of the bis(phthalimide) at the substituted position. In this method, a substituted phthalic anhydride of formula (7)

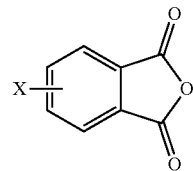
(7)

wherein X is a leaving group (such as a nitro group or a halogen), is condensed (imidized) with an organic diamine of formula (8)

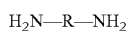
$H_2N$—R—$NH_2$ (8)

wherein R is as described in formula (1), in the presence of diphenyl sulfone at a temperature of greater than 130° C. to form a composition comprising bis(phthalimide) of formula (9) and diphenyl sulfone

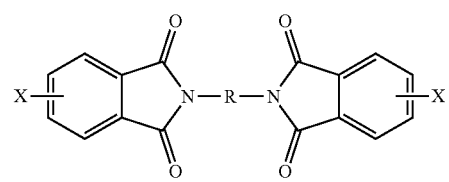
(9)

wherein X is a leaving group as in formula (7) and R is a linker as described in formula (1).

In an embodiment, X is a nitro group or a halogen, specifically fluoro, chloro, bromo, iodo, more specifically chloro. A mixture of different X groups can be used.

Illustrative examples of amine compounds of formula (8) are described in U.S. Pat. Nos. 3,875,116; 6,919,422 and 6,355,723 for example. Combinations comprising any of the foregoing amines can be used. Specifically, diamine (8) is a meta-phenylene diamine (8a), a para-phenylene diamine (8b), or a diamino diaryl sulfone (8c), or an arylene ether (8d)

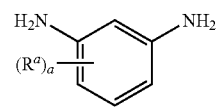
(8a)

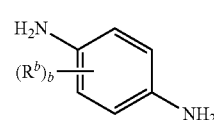
(8b)

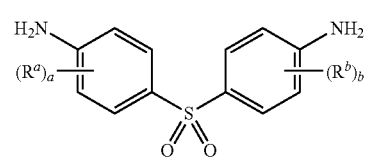
(8c)

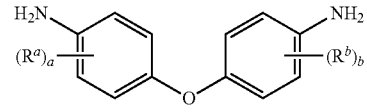
(8d)

wherein $R^a$ and $R^b$ are each independently a halogen atom, nitro, cyano, $C_2$-$C_{20}$ aliphatic group, $C_2$-$C_{40}$ aromatic group, and a and b are each independently 0 to 4. Specific examples include meta-phenylenediamine (mPD), para-phenylenediamine (pPD), 2,4-diaminotoluene, 2,6-diaminotoluene, 2-methyl-4,6-diethyl-1,3-phenylenediamine, 5-methyl-4,6-diethyl-1,3-phenylenediamine, 1,3-diamino-4-isopropylbenzene, 4,4'-oxydianiline (ODA), bis(aminophenoxy phenyl) sulfones (BAPS) and 4,4'-diamino diphenyl sulfone (DDS). In some embodiments of bis(phthalimide) (9), X is chloro or fluoro, specifically chloro, and R is m-phenylene, p-phenylene, an arylene ether such as p,p-diphenylether, a diarylsulfone such as diphenylsulfone, or a combination comprising at least one of the foregoing.

The substituted phthalic anhydride of formula (7), the organic diamine of formula (8), and diphenyl sulfone, sulfolane, or a combination comprising at least one of the foregoing solvents can be combined in any order. In an embodiment, the diphenyl sulfone is first heated to a molten state, then the substituted phthalic anhydride of formula (7), the organic diamine of formula (8) are added to the molten diphenyl sulfone either alone, or in combination.

In an advantageous feature, the condensation of a substituted phthalic anhydride of formula (7) and an organic diamine of formula (8) (imidization) is conducted without any imidization catalysts typically used in imidization reactions.

The bis(phthalimide)s (9) are generally prepared at least at 130° C., specifically 150° to 275° C., more specifically 160 to 250° C. Atmospheric or super-atmospheric pressures can be used, for example up to 5 atmospheres, to facilitate the use of high temperatures without causing solvent to be lost by evaporation.

The reaction of the substituted phthalic anhydride (7) with the organic diamine (8) to form bis(phthalimide) (9) is generally conducted for 0.5 to 30 hours, specifically 1 to 20 hours, more specifically 1 to 10 hours, still more specifically 2 to 8 hours, and yet more specifically 3 to 7 hours. Advantageously, conversion to the bis(phthalimide) is 99% complete, based on the moles of the substituted phthalic anhydride, in less than 6 hours.

The diphenyl sulfone, sulfolane, or a combination comprising at least one of the foregoing solvents, organic diamine (8), and substituted phthalic anhydride (7) can be combined in amounts such that the total solids content during the reaction to form bis(phthalimide) (9) does not exceed 80 weight percent (wt. %), or does not exceed 60 wt. %. For example, the total solids content can be 1 to 40 wt. %, or 1 to 30 wt. %, or 1 to 25 wt. %. "Total solids content" expresses the proportion of the reactants as a percentage of the total weight including liquids such as molten diphenyl sulfone, sulfolane, or a combination comprising at least one of the foregoing solvents present in the reaction at any given time.

In an embodiment, the amount of diphenyl sulfone or sulfolane is adjusted based on the amount of bis(phthalimide) (9). In particular, the amount is based on the weight of the bis(phthalimide) (9) divided by the sum of the weight of the bis(phthalimide) (9) plus the weight of the diphenyl sulfone or sulfolane as follows:

$$\frac{\text{weight of bis(phthalimide) (9)}}{\text{weight of bis(phthalimide) (9) + weight of diphenyl sulphone or sulfolane}} (100)$$

and can be 1 to 30%, specifically 15 to 25%, or 18 to 22%.

It can be desirable to have low water content in the imidization reaction mixture. Thus, in some embodiments, the combined substituted phthalic anhydride, organic diamine, and diphenyl sulfone, sulfolane, or a combination comprising at least one of the foregoing can comprise less than or equal to 200 parts per million parts of the combined components weight (ppm) of water, more specifically, less than or equal to 100 ppm of water, still more specifically, less than or equal to 50 ppm of water, or, yet more specifically, less than or equal to 25 ppm of water. In some embodiments, the combined substituted phthalic anhydride, organic diamine, and diphenyl sulfone, sulfolane, or a combination comprising at least one of the foregoing solvents comprise less than or equal to 100 ppm water.

A molar ratio of substituted phthalic anhydride (7) to diamine (8) of 1.95:1 to 2.05:1, specifically 1.98:1 to 2.02:1, more specifically 1.98:1 to 2.01:1, or 2:1 can be used. While other ratios can be employed, a slight excess of anhydride can be desirable. A proper stoichiometric balance between substituted phthalic anhydride (7) and diamine (8) is maintained to prevent undesirable by-products that can limit the molecular weight of the polyetherimide polymer prepared from the bis(phthalimide), and/or result in polymers with amine end groups. Accordingly, in an embodiment, the imidization process includes contacting diamine (8) with substituted phthalic anhydride (7) in the presence of diphenyl sulfone, sulfolane, or a combination comprising at least one of the foregoing solvents at a temperature of greater than 130° C. to form a reaction mixture having a targeted initial molar ratio of substituted phthalic anhydride to diamine; further heating the reaction mixture; analyzing the molar ratio of the further heated reaction mixture to determine the actual initial molar ratio of substituted phthalic anhydride (7) to diamine (8); and, if necessary, adding substituted phthalic anhydride (7) or diamine (8) to the analyzed reaction mixture to adjust the molar ratio of substituted phthalic anhydride (7) to diamine (8) to the desired value, for example 1.98:1 to 2.02:1.

In some embodiments, an endcapping agent is formed during imidization, or the imidization is conducted in the presence of an endcapping agent. The endcapping agent can be formed before or during imidization by addition of a monofunctional reactant that reacts with one of the amine groups of diamine (8), thereby "capping" the amine end group. Other endcapping agents include phenates, for example the salts of any monophenol, p-cumyl phenol. Such mono-capped diamines endcap the polymer during polymerization, and thus can be used to control the molecular weight of the polymer or the end groups of the polymer. Accordingly, the monofunctional reactant has a functional group that reacts with an amine of diamine (8) for example, a phthalic anhydride, acyl alkyl halide, acyl aryl halide, aldehyde, ketone, ester, isocyanate, chloroformate, sulfonyl chloride, a phenate, and the like. A combination of different monofunctional reactants can be present. In an embodiment the monofunctional reactant is a phthalic anhydride without a halogen, nitrogen, or other leaving group substitution. For example, when a combination of substituted phthalic anhydride (7) and unsubstituted phthalic anhydride are reacted with organic diamine (8), the product comprises bis(phthalimide) (9) and monofunctional bis(phthalimide) (18)

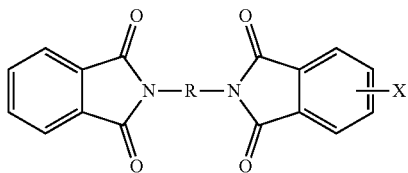

(18)

wherein R and X are as defined in formula (9).

The amount of monofunctional reactant added will depend on the desired amount of endcapping agent. For example, the amount of monofunctional reactant present in the imidization reaction can be more than 0 to 10 mole percent, specifically 1 to 10 mole percent, and more specifically to 6 mole percent, based on total moles of substituted phthalic anhydride (7). The monofunctional reactant can be added at any time, e.g., to the diamine (8), the substituted phthalic anhydride (7), the solvent, or a combination thereof, before or after imidization has started, in the presence or absence of the imidization catalyst.

Alternatively, or in addition to the above monofunctional reactants, or monofunctional bis(phthalimides) can be added as endcapping agents. Thus, in some embodiments, the method further comprises the direct addition of an endcapping agent such as a monofunctional bis(phthalimide) (18). Thus, imidization can be conducted by stepwise, simultaneously or essentially simultaneously combining the reactants, i.e., substituted phthalic anhydride (7), organic amine (8), solvent, imidization catalyst, and the monofunctional reactant or endcapping agent such as a monofunctional bis(phthalimide).

The bis(phthalimide) composition comprising diphenyl sulfone can be used for the subsequent polymerization step, described below, without purification. Alternatively, the bis (phthalimide) composition can be subject to further purification as is known in the art before polymerization.

Thus, after imidization, the leaving group X of bis(phthalimide) (9)

(9)

is displaced by reaction with an alkali metal salt of a dihydroxy aromatic compound of formula (10)

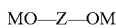

MO—Z—OM    (10)

wherein M is an alkali metal and Z is as described in formula (1), to provide the polyetherimide of formula (1)

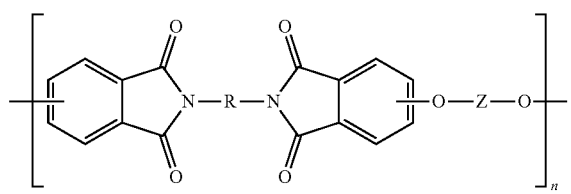

(1)

wherein n, R, and Z are as defined above.

Alkali metal M can be any alkali metal, for example lithium, sodium, potassium, and cesium. Thus alkali metal salt (10) is a lithium salt, sodium salt, potassium salt, cesium salt, or a combination comprising at least one of the foregoing. Specific alkali metals are potassium or sodium. In preferred embodiments herein, M is potassium. The alkali metal salt can be obtained by reaction of a metal hydroxide with aromatic $C_{6-24}$ monocyclic or polycyclic dihydroxy aromatic compound optionally substituted with 1 to 6 $C_{1-8}$ alkyl groups, 1 to 8 halogen atoms, or a combination thereof, for example a dihydroxy aromatic compound of formula (11):

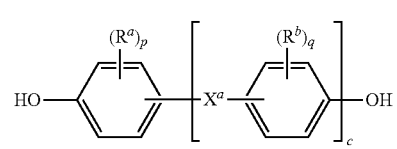

(11)

wherein $R^a$, $R^b$, and $X^a$ are as described in formula (4). In some embodiments the dihydroxy aromatic compound is bisphenol A, hydroquinone, bisphenol, resorcinol, or a combination comprising at least one of the foregoing. For example, the dihydroxy aromatic compound can be 2,2-bis (4-hydroxyphenyl) propane ("bisphenol A" or "BPA"). The alkali metal salt can be used in a powder form or in a slurry form. The slurry form of the alkali metal salt comprises an alkali metal salt dispersed in a solvent such as ortho-dichlorobenzene, toluene, molten diphenyl sulfone, sulfolane, and xylenes. Once combined with bis(phthalimide) (9), the solvent in the slurry of alkali metal salt can be removed before the polymerization reaction starts. In an embodiment, the slurry form comprises an alkali metal salt dispersed in ortho-dichlorobenzene.

Advantageously, polymerization of bis(phthalimide) (9) in diphenyl sulfone with alkali metal salt (10) can be conducted without the presence of a polymerization catalyst. In another embodiment, the polymerization is conducted in the presence of a polymerization catalyst. Examples of polymerization catalysts are the quaternary ammonium salts, quaternary phosphonium salts, guanadinium salts, pyridinium salts, imidazolium salts described above, in particular guanidinium salts. Examples of guanidinium salts are hexaalkylguanidinium and α,ω-bis(pentaalkylguanidinium) alkane salts, and an example of a hexaalkylguanidinium salt is hexaethylguanidinium chloride.

If necessary, additional diphenyl sulfone can be added. Other non-polar solvents, preferably with a boiling point above 100° C., specifically above 150° C., for example o-dichlorobenzene, dichlorotoluene, 1,2,4-trichlorobenzene, a monoalkoxybenzene such as anisole, veratrole, diphenylether, or phenetole. Preferably polar aprotic solvents such as dimethylformamide (DMF), dimethylacetamide (DMAc), dimethylsulfoxide (DMSO), tetramethylene sulfone (sulfolane), or N-methylpyrrolidinone (NMP) are not used as a solvent or a co-solvent. In an embodiment, no NMP is present. In an embodiment, the polymerization is carried out in diphenyl sulfone and no other solvents are used. A total solids content of the bis(phthalimide) (9) in the polymerization can be as described above, for example 15 to 25 wt. %, based on the total weight of the polymerization mixture. "Total solids content" refers to the proportion of the reactants as a percentage of the total weight of the polymerization mixture, including solvents, such as diphenyl sulfone, sulfolane, or a combination comprising at least one of the foregoing solvent.

Polymerization can be conducted at least 110° C., specifically 150° to 275° C., more specifically 160 to 250° C. Atmospheric or super-atmospheric pressures can be used, for example up to 5 atmospheres, to facilitate the use of high temperatures without causing solvent to be lost by evaporation.

The polymerization can be conducted for 0.5 to 30 hours, specifically 1 to 20 hours, more specifically 1 to 10 hours, still more specifically 2 to 8 hours, and yet more specifically 3 to 7 hours. The yellowness index of polyetherimide (1) can depend on the polymerization time such that the longer the polymerization time, the higher the yellowness index. Thus it is generally desirable to minimize the polymerization time.

In some embodiments, the alkali metal salt (10) is added directly to the composition containing the bis(phthalimide) (9) and the diphenyl sulfone, sulfolane, or a combination comprising at least one of the foregoing. Water removal from the system can be accomplished in either batch, semi-continuous or continuous processes using means known in the art such as a distillation column in conjunction with one or more reactors. Other methods for water removal include passing the condensed distillate through a drying bed for chemical or physical adsorption of water.

The molar ratio of the alkali metal salt (10) to the bis(phthalimide) (9) can be 0.94:1 to 1.0:1.0, specifically 0.96:1 to 0.99:1, and more specifically 0.97:1 to 0.99:1. Adjusting this ratio allows adjustment of the molecular weight of the polymer.

The bis(phthalimide) composition and the polyetherimide composition can be manufactured in separate vessels. Advantageously, since the bis(phthalimide) composition can be used directly in the polymerization reaction without purification, the bis(phthalimide) composition and the polyetherimide composition can be manufactured in the same vessel. As described above, in some embodiments an endcapping agent is formed during imidization or added to the imidization. Alternatively, the polymerization further comprises the addition of an endcapping agent. The endcapping agent can be phthalimide, the monofunctional bis (phthalimide) (18), or a monofunctional alkali metal phenate. The amount of the endcapping agent can vary. The endcapping agent can be added stepwise, simultaneously or essentially simultaneously with the bis(phthalimide) (9) and the alkali metal salt (10).

After polymerization, the polymer is isolated. For example, the reaction mixture can be cooled, and the polymer solidified. The polymer can be broken and ground to a powder, then slurried with a solvent miscible with the diphenyl sulfone or sulfolane (e.g., acetone), and the polymer separated from the acetone (e.g., by filtration or centrifugation) to remove residual diphenyl sulfone or sulfolane. Byproduct salt (e.g., NaCl) can be removed from the product by the polymer washing with water, for example acidified water. The polymer can again be isolated (e.g., filtered or centrifuged), dried (by, for example washing with acetone, followed by oven drying). For convenience, the polymer can then be extruded to form pellets. Other methods for isolation can be used, for example quenching, followed by addition of a solvent such as methylene chloride to form a suspension and dissolve the polymer. Any contaminating solid can be removed, and the polymer solution added to a solvent such as acetone to precipitate the polymer while leaving the diphenyl sulfone or sulfolane in solution with the acetone. The polymer can be further washed and dried.

In an embodiment, the polyetherimide compositions manufactured according to the methods of the disclosure contain greater than 0.1 parts per million of diphenyl sulfone, sulfolane, or a combination comprising at least one of the foregoing solvents, based on the total weight of the composition. For example, a sample of the polyetherimide compositions can contain 0.1 to 10,000 parts per million of diphenyl sulfone, sulfolane, or a combination comprising at least one of the foregoing solvents, or 1 to 1,000 parts per million of diphenyl sulfone, sulfolane, or a combination comprising at least one of the foregoing solvents, or 0.1 to 100 parts per million of diphenyl sulfone, sulfolane, or a combination comprising at least one of the foregoing solvents, each based on the total weight of the composition. In other embodiments, the polyetherimide compositions can have greater than 1 part per million of sodium or potassium based on the total weight of the composition. For example, a sample of the polyetherimide compositions can contain 1 to 10,000 parts per million of d sodium or potassium, or 10 to 10,000 parts per million of sodium or potassium, or 10 to 1,000 parts per million of sodium or potassium, each based on the total weight of the composition. The polyetherimides can have a yellowness index of less than 300 or less than 250, determined as described herein.

The polyetherimides can be formulated to provide a wide variety of polyetherimide compositions for the manufacture of articles. The polyetherimide compositions can optionally comprise a filler. In some instances it is desired to have polyetherimide compositions wherein a filler is substantially absent. "Substantially absent" means that the composition has less than 3 wt. % of a filler, and in other embodiments less than 1 wt. % filler by weight of the composition. In other instances, it is advantageous to have polyetherimide compositions wherein a filler is absent.

The polyetherimide compositions can include various additives ordinarily incorporated into polymer compositions of this type, with the proviso that the additives are selected so as to not significantly adversely affect the desired properties of the composition. Exemplary additives include catalysts, impact modifiers, fillers, antioxidants, thermal stabilizers, light stabilizers, ultraviolet light (UV) absorbing additives, quenchers, plasticizers, lubricants, mold release agents, antistatic agents, visual effect additives such as dyes, pigments, and light effect additives, flame retardants, anti-drip agents, and radiation stabilizers. In some embodiments, the polyetherimide composition comprises a solvent, and the composition is in the form of a varnish. Combinations of additives can be used, for example a combination of a heat stabilizer, a mold release agent, and optionally an ultraviolet light stabilizer. In general, the additives are used in the amounts generally known to be effective. The foregoing additives (except any fillers) are generally present in an amount from 0.005 to 20 wt. %, specifically 0.01 to 10 wt. %, based on the total weight of the composition. Alternatively, in some embodiments, our compositions do not contain appreciable amounts of additives, and in some embodiments, there are no detectable amounts of additives, i.e., additives are substantially absent or absent from the compositions. Accordingly, the foregoing additives (except any fillers) can be individually present in an amount from 0.001 to 20 wt. %, 0.01 to 10 wt. %, or 0.01 to 5 wt. %, based on the total weight of the composition. In another embodiment, no appreciable amount of any additive other than a heat stabilizer, a mold release agent, and optionally an ultraviolet light stabilizer is present in the compositions. In still another embodiment, no detectable amount of any additive other than a heat stabilizer, a mold release agent, and optionally an ultraviolet light stabilizer is present in the compositions.

In some embodiments, the polyetherimide composition can further include at least one additional polymer. Examples of such additional polymers include and are not limited to PPSU (polyphenylene sulfone), polyetherimides, PSU (polysulfone), PPE (polyphenylene ether), PFA (perfluoroalkoxy alkane), MFA (co-polymer of TFE tetrafluoroethylene and PFVE perfluorinated vinyl ether), FEP (fluorinated ethylene propylene polymers), PPS (poly(phenylene sulfide), PTFE (polytetrafluoroethylene), PA (polyamide), PBI (polybenzimidizole), PAI (poly(amide-imide)), poly (ether sulfone), poly(aryl sulfone), polyphenylene, polybenzoxazoles, polybenzthiazoles, as well as blends and co-polymers thereof. When present, the polymer is used in an amount from more than 0 to 20 wt. %, specifically 0.1 to 15 wt. %, and more specifically from 0.5 to 10 wt. %, all based on the total weight of the polyetherimide composition. In some embodiments, no polymer other than the polyetherimide as described herein is present in the polyetherimide composition.

The polyetherimide composition can be prepared by blending the ingredients under conditions for the formation of an intimate blend. Such conditions often include melt mixing in single or twin screw-type extruders, mixing bowl, or similar mixing devices that can apply a shear to the components. Twin-screw extruders are often preferred due to their more intensive mixing capability and self-wiping capability, over single screw extruders. It is often advantageous to apply a vacuum to the blend through at least one vent port in the extruder to remove volatile impurities in the composition. Often it is advantageous to dry the polyetherimide composition prior to melt mixing. The melt mixing is often done at 290 to 340° C. to avoid excessive polymer degradation while still allowing sufficient melting to get an intimate polymer mixture free of any unbelted components. The polymer blend can also be melt filtered using a 40 to 100 micrometer candle or screen filter to remove undesirable black specks or other heterogeneous contaminants.

In an exemplary process, the polyetherimide, any other polymers, and any additives are placed into an extrusion compounder to produce a continuous strand that is cooled and then chopped into pellets. In another procedure, the components are mixed by dry blending, and then fluxed on a mill and comminuted, or extruded and chopped. The composition and any optional components can also be mixed and directly molded, e.g., by injection or transfer molding techniques. Preferably, all of the components are freed from as much water as possible. In addition, compounding is carried out to ensure that the residence time in the machine is short; the temperature is carefully controlled; the friction heat is utilized; and an intimate blend between the components is obtained.

The polyetherimide composition can be formed into an article by any number of methods including shaping, extruding (including profile extrusion), thermoforming, and molding, including injection molding, compression molding, gas assist molding, structural foam molding, and blow molding. In some embodiments, a method of forming an article comprises shaping, extruding, blow molding, or injection molding the composition to form the article. The polyetherimide compositions can also formed into articles using thermoplastic processes such as film extrusion, sheet extrusion, melt casting, blown film extrusion, and calendaring. Co-extrusion and lamination processes can be used to form composite multi-layer films or sheets. The article is a sheet, film, multilayer sheet, multilayer film, molded part, extruded profile, coated part, pellets, powder, foam, fiber, fibrids, flaked fibers, or a combination comprising at least one of the foregoing.

The polyetherimide composition can be molded into an article with any equipment conventionally used for molding thermoplastic compositions, such as a Newbury or van Dorn type injection-molding machine with conventional cylinder temperatures of 250° C. to 320° C., and conventional mold temperatures of 55° C. to 120° C.

It is appreciated that in an embodiment, tetramethylene sulfone (sulfolane) can be used as an alternative to diphenyl sulfone. Accordingly, whenever diphenyl sulfone is mentioned, it can be replaced with tetramethylene sulfone (sulfolane).

The methods of the manufacture of bis(phthalimide) and polyetherimide compositions are further illustrated by the following non-limiting examples.

EXAMPLES

Materials

The materials in Table 1 were used or made in the following Examples and Comparative Examples.

TABLE 1

| Acronym | Description | Source |
|---|---|---|
| BPA | 2,2-Bis(4-hydroxyphenyl)propane, (Bisphenol A) | Hexion |
| BP | Bisphenol | |
| $K_2$BPA | Bisphenol, dipotassium salt | Examples |
| $Na_2$BPA | Bisphenol, disodium salt | Examples |
| KOH | Potassium hydroxide | Acculute |
| IPA | Isopropyl alcohol | Aldrich |
| DPS | Diphenyl sulfone | |
| DDS | Diaminodiphenyl sulfone | |
| o-DCB | ortho-Dichlorobenzene | Fischer |
| ClPA | Mixture of 3-chlorophthalic anhydride and 4-chlorophthalic anhydride | SABIC |
| 3ClPA | 3-Chlorophthalic anhydride | |
| 4ClPA | 4-Chlorophthalic anhydride | |
| mPD | meta-Phenylene diamine | DuPont |
| pPD | para-Phenylene diamine | |
| ODA | Oxydianiline | |
| AcOH | Acetic acid | Aldrich |
| ClPAMI | 1,3-bis[N-(3- or 4-chlorophthalimido)]benzene | Examples |
| 3ClPAMI | 1,3- or 1,4-bis[N-(3-Chlorophthalimido)]benzene | Examples |
| 4ClPAMI | 1,3- or 1,4-bis[N-(4-Chlorophthalimido)]benzene | Examples |
| 4ClPAMIDPE | 4,4'-bis[N-(4-Chlorophthalimido)]diphenyl ether | Examples |
| 3ClPAMIDPE | 4,4'-bis[N-(3-Chlorophthalimido)]diphenyl ether | Examples |
| 3ClPAMIDPS | 4,4'-bis[N-(3-Chlorophthalimido)]diphenyl sulfone | Examples |
| 4ClPAMIDPS | 4,4'-bis[N-(4-Chlorophthalimido)]diphenyl sulfone | Examples |
| PA | Phthalic anhydride | |
| NaPCP | Sodium para-cumyl phenol | |
| HEGCl | Hexaethyl guanidinium chloride | |
| PEI | Polyetherimide | Examples |
| $H_3PO_4$ | Phosphoric acid | Fischer |

Weight average molecular weight (Mw) of the polymer product was determined by gel permeation chromatography (GPC) using polystyrene standards.

In a 20 ml glass vial, about 20 mg of the polymer sample was taken and dissolved into a quench solution (3.5 L $CH_2Cl_2$+120 mL AcOH+30 mL o-DCB) followed by filtration with 0.25 micron filter into an HPLC vial. The solution was analyzed by GPC with polystyrene standard (HPLC 2695, Waters GPC software using 2487 Dual absorbance detector of wavelength 254 nm and Mixed Bed C, PLgel 5 micrometer, 300×7.5 mm, P/N 1110-6500 column).

The yellowness index of the polyetherimide was determined by measuring the YI of a solution of the polymer (about 2 g diluted up to 100 mL using an acetonitrile-water mixture (60:40 mix by volume) on a Gretag Macbeth Color Eye 7000A instrument. The instrument reading was referred to as solution YI. The YI values reported are predicted plaque YI calculated based on the following correlation of Eq. (2):

$$\text{Predicted Plaque YI} = (\text{Solution YI} + 18.2)/0.5986 \qquad (2)$$

$BPAK_2$ Powder

A 500 mL 3-neck round bottomed flask (24/40) was equipped with an overhead stirrer through its center joint. One of the side joints was connected to a nitrogen sweep while the other was connected to a nitrogen blanket connected to a bubbler via a Dean-Stark trap with its arm wrapped in a heating tape. The flask was then charged with 11.4145 g BPA (0.05 moles, 1 equiv.) and 0.1 moles aqueous KOH solution (Acculute). The overhead stirrer was turned on and the flask was immersed into the oil bath at 80° C. The stirring was continued for 1 h. Another 500 mL 3-neck flask with the above set-up was charged with 200 mL o-DCB and heated to 160° C. The aqueous salt solution was slowly cannulated into the flask containing o-DCB. After stripping off majority of the water, the salt started to crash out as solid in the wall of the flask. The temperature of the flask was then decreased to 100° C. and 100 mL IPA was added slowly while stirring. The solid dissolved again. Upon stripping of the solvents while slowly increasing the temperature to 160° C., the solution started to become cloudy and then to a slurry in o-DCB. The salt was converted into a dry powder by further stripping off o-DCB and placing it into a vacuum oven at 150° C. for 12 h.

$BPANa_2$ Slurry

A 500 mL 3-neck round bottomed flask (24/40) was equipped with an overhead stirrer through its center joint. One of the side joints was connected to a nitrogen sweep while the other was connected to a nitrogen blanket connected to a bubbler via a Dean-Stark trap with its arm wrapped in a heating tape. The flask was then charged with 11.4145 g BPA (0.05 moles, 1 equiv.) and 0.1 moles aqueous KOH solution (Acculute). The overhead stirrer was turned on and the flask was immersed into the oil bath at 80° C. The stirring was continued for 1 h. Another 500 mL 3-neck flask with the above set-up was charged with 200 mL o-DCB and heated to 160° C. The aqueous salt solution was slowly cannulated into the flask with o-DCB. The water and o-DCB was stripped off into the Dean-Stark with the nitrogen sweep while the salt slurry was forming. The stripping off continued until the Karl-Fisher analysis showed the moisture level <50 ppm in the overheads distillate.

Example 1

This example demonstrates the synthesis of ClPAMI from ClPA and mPD in diphenyl sulfone without using other solvents. The ClPAMI composition containing diphenyl sulfone can be reacted with $BPAK_2$ powder directly without purification. No catalyst is needed for the polymerization.

A 500 mL 3-neck round bottomed flask (24/40) was equipped with an overhead stirrer through its center joint. One of the side joints was connected to a nitrogen sweep while the other was connected to a nitrogen blanket connected to a bubbler via a Dean-Stark trap with its arm wrapped in a heating tape. The flask was then immersed into an oil bath at 170° C. and DPS (50 g) was added. Once the DPS was completely molten, stirrer was turned on and 2.671 g m-PD (0.0247 moles, 1.0 equiv.) and 9.054 g ClPA (0.0496 moles, 2.008 equiv.) were added into the molten DPS (making it ~18% solid) at 170° C. and the temperature was slowly increased to 200° C. The initial solution converted into a thick white slurry of ClPAMI. The heating was continued for 3 h and the slurry became slightly thinner.

To the stirring slurry of ClPAMI (10.8 g, 0.0247 moles, 1 equiv.), $K_2BPA$ salt powder (7.308 g, 95.7% solid, 0.024 moles, 0.93 equiv.) was added. The temperature of the reaction mixture was increased from 170° C. to 220° C. The mixture first became thick solid and then became thinner. Mw build was monitored by GPC analysis. The salt addition was made twice to make 0.95 (2.5 h) and finally 0.97 (4.5 h) molar ratio with respect to ClPAMI. The Mw of polyetherimide as a function of time is shown in FIG. 1.

The reaction was quenched with phosphoric acid (85%, 670 mg) at 170° C. and stirred for 30 min. The mixture was then transferred into a 500 mL flask with a Teflon cap and cooled. Methylene chloride (200 mL) was added into the solidified polymer solution. The mixture was shaken to convert the solid into a suspension. The suspension was filtered through 2.7 micron filter paper in a Buchner Funnel to remove the precipitated solid. The clear polymer solution in DPS and methylene chloride was slowly added to 300 mL acetone with constant agitation by a homogenizer to precipitate the polyetherimide which was filtered and washed with 200 mL acetone to provide a polyetherimide powder, which was subsequently dried in vacuum at room temperature.

Example 2

This example demonstrates that the ClPAMI composition containing diphenyl sulfone can be reacted with $BPANa_2$ slurry directly without purification. No catalyst is needed for the polymerization.

Figure 2:
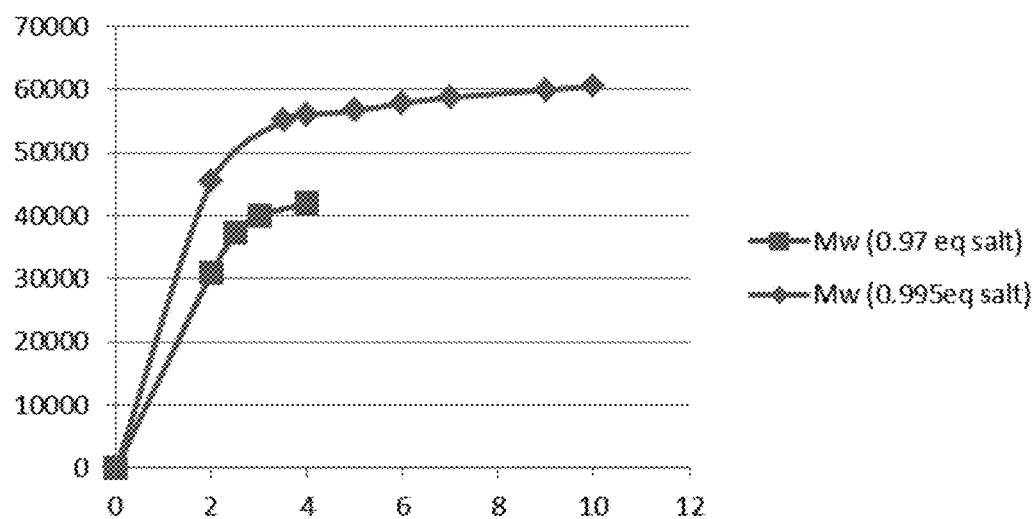
FIG. 2 is a graph of Mw of polyetherimide as a function of polymerization time with different bisphenol A salt and ClPAMI molar ratio.

A slurry of $BPANa_2$ in o-DCB made in a separate flask was added to the ClPAMI slurry made as shown in example 1. Then o-DCB was stripped off into Dean-Stark with the help of heating tape and nitrogen sweep. Once ODCB was removed, polymerization started. The Mw was monitored in GPC with polystyrene standard. Decreasing the molar ratio of salt and ClPAMI decreased the Mw of polyetherimide, showing the possibility of Mw control. The results are shown in FIG. 2. Polyetherimide was quenched and isolated following the same procedure as shown in Example 1.

Example 3—Synthesis of PEI from Polymerization of 4ClPAMI Derived from 4ClPA and Metaphenylene Diamine (mPD) in DPS Using $Na_2BPA$ Salt Slurry in o-DCB A 500 mL 3-neck round bottomed flask (24/40) was equipped with an overhead stirrer. The flask was also connected to a nitrogen sweep and a nitrogen blanket. The nitrogen blanket was connected to a bubbler via a Dean-Stark trap with its arm wrapped in a heating tape. The flask was then immersed into an oil bath at 170° C. and DPS (100 g) was added. Once the DPS was completely molten, stirrer was turned on and 5.409 g m-PD (0.05 moles, 1.0 equiv.) and 18.329 g 4ClPA (0.1004 moles, 2.008 equiv.) were added into the molten DPS (making it about 18% solid) at 170° C. and the temperature was slowly increased to 200° C. The initial solution converted into a thick white slurry of 4ClPAMI in DPS. The heating was continued for 4 h and the slurry became slightly thinner. At that point, the stoichiometry analysis of the reaction mixture showed the presence of 0.37 mol % of residual 4ClPA and 0.49 mol % of residual monoamine in the reaction mixture.

To the stirring slurry of 4ClPAMI, Na$_2$BPA salt slurry (94.31 g, 14.0% solid in o-DCB, 0.0485 moles, 0.97 equiv.) was added. The temperature of the reaction mixture was increased from 170° C. to 200° C. The heating tape on the arm of the Dean-Stark trap was turned on and the o-DCB was removed from the reaction mixture with the help of nitrogen sweep. GPC analysis with polystyrene standard showed the Mw plateau of 58018 D in 18 hours with PDI of 2.69.

The reaction was quenched with phosphoric acid (85%, 670 mg) at 170° C. and stirred for 30 min, and transferred into an aluminum pan to cool into room temperature. The solid polymer mixture was broken into pieces and dissolved in 200 mL methylene chloride. The solution was filtered through 0.7μ porous filter paper to remove the salt. The solution was precipitated in 500 mL acetone filtered and washed with acetone (2×500 ml) and the filtered cake was dried in vacuum oven. The polymer had a Tg of 215° C. and YI of 133.

Example 4—Synthesis of PEI from Polymerization of 4ClPAMI Derived from 4ClPA and mPD in DPS Using Na$_2$BPA Salt Slurry in o-DCB in the Presence of Phase Transfer Catalyst HEGCl Following the procedure described in example 3, 5.409 g m-PD (0.05 moles, 1.0 equiv.) and 18.329 g 4ClPA (0.1004 moles, 2.008 equiv.) were used to synthesize 4ClPAMI with 4ClPA and monoamine residues respectively 0.31 and 0.34 mol %. To the stirring slurry of 4ClPAMI, Na$_2$BPA salt slurry (87.79 g, 15.04% solid in o-DCB, 0.0485 moles, 0.97 equiv.) was added followed by the addition of HEGCl (0.659 g, 0.0005 moles, 0.01 equiv). GPC analysis with polystyrene standard showed the Mw plateau of 55083 D in 8 hours with PDI 2.97.

The polymer mixture was poured into an aluminum pan without quenching and allowed to cool. The solidified polymer solution was broken into pieces and powdered with the help of blender. The polymer was washed with acetone (3×500 mL) and cake was mixed with 500 mL pH 2 DI water (acidified with HCl) and shaken for 30 min followed by filtration and the washing with DI water (3×500 mL). The polymer cake was finally washed with additional 100 mL acetone and dried in vacuum oven at 150° C. The isolated polymer has 50 ppm residual sodium ions, Tg of 221° C., and 98 ppm of OH.

Example 5—Synthesis of PEI from Polymerization of 4ClPAMI Derived from 4ClPA and mPD in DPS Using Na$_2$BPA Salt Slurry in o-DCB and Phthalic Anhydride (PA) as Chain Stopper Following the procedure described in example 3, 5.409 g m-PD (0.5 moles, 1.0 equiv.) and 18.237 g 4ClPA (0.0999 moles, 1.998 equiv.) and 74 mg PA (0.05 mmol, 0.01 equiv) were used to synthesize 4ClPAMI with 4ClPA and mono-amine residues respectively 0.67 and 0.31 mol %. To the stirring slurry of ClPAMI, Na$_2$BPA salt slurry (88.04 g, 15% solid in o-DCB, 0.0485 moles, 0.97 equiv.) was added. GPC analysis with polystyrene standard showed the Mw plateau of 49377 D in 8 hours with PDI 2.94. The polymer was isolated as described in example 4 and had a Tg of 219° C. and 440 ppm OH.

Example 6—Synthesis of PEI from Polymerization of 4ClPAMI Derived from 4ClPA and mPD in DPS Using Na$_2$BPA Salt Slurry in o-DCB and NaPCP as Chain Stopper Following the procedure described in example 3, 5.409 g m-PD (0.5 moles, 1.0 equiv.) and 18.237 g 4ClPA (0.0999 moles, 1.998 equiv.) were used to synthesize 4ClPAMI with 4ClPA and monoamine residues respectively 0.53 and 0.31 mol %. To the stirring slurry of 4ClPAMI, Na$_2$BPA salt slurry (88.04 g, 15% solid in o-DCB, 0.0485 moles, 0.97 equiv.) and NaPCP (234 mg, 15% solid in O-DCB, 1.0 mmol, 0.02 equiv) was added. GPC analysis with polystyrene standard showed the Mw plateau of 43370 D in 21 hours with PDI 2.35.

The reaction was quenched with phosphoric acid (85%, 670 mg) at 170° C. and stirred for 30 min. The mixture was then transferred into an aluminum pan and cooled to room temperature. The solidified polymer solution was broken into pieces and powdered with the help of blender. The powdered polymer mixture was washed with acetone (3×500 mL) followed by the washing with DI water (3×500 mL). The final polymer was washed with additional 100 mL acetone and dried in vacuum oven at 150° C. The polymer was characterized as follows: Tg 220° C.; OH 479 ppm; and YI 96.

Example 7—Synthesis of PEI from Polymerization of 4ClPAMI Derived from 4ClPA and mPD in DPS Using Na$_2$BPA Salt Slurry in o-DCB and KP to Reduce OH End Groups Following the procedure described in example 3, 5.409 g m-PD (0.05 moles, 1.0 equiv.) and 18.329 g 4ClPA (0.1004 moles, 2.008 equiv.) were used to synthesize 4ClPAMI with 4ClPA and monoamine residues respectively 0.31 and 0.34 mol %. To the stirring slurry of 4ClPAMI, Na$_2$BPA salt slurry (94.65 g, 13.95% solid in o-DCB, 0.0485 moles, 0.97 equiv.) was added followed by the addition of KP (0.296 g). GPC analysis with polystyrene standard showed the Mw plateau of 55083 D in 8 hours with PDI 2.97. The polymer was isolated as described in example 4 and had YI of 93, 245 OH end groups and 203 ppm sodium ions.

Example 8—Synthesis of PEI from Polymerization of 4ClPAMI Derived from 4ClPA and mPD in DPS Using Na$_2$BPA Salt Slurry in o-DCB and Na$_2$CO$_3$ to Reduce OH End Groups Following the procedure described in example 3, 5.409 g m-PD (0.05 moles, 1.0 equiv.) and 18.329 g 4ClPA (0.1004 moles, 2.008 equiv.) were used to synthesize 4ClPAMI with 4ClPA and monoamine residues respectively 0.40 and 0.54 mol %. To the stirring slurry of 4ClPAMI, Na$_2$BPA salt slurry (88.04 g, 15.0% solid in o-DCB, 0.0485 moles, 0.97 equiv.) was added followed by the addition of Na$_2$CO$_3$ (0.23 g). GPC analysis with polystyrene standard showed the Mw plateau of 48371 D in 21 hours with PDI 2.45. The polymer was isolated as described in example 6 and had 432 ppm OH end groups and 198 ppm sodium ions.

Example 9—Synthesis of PEI from Polymerization of 3ClPAMI Derived from 3ClPA and mPD in DPS Using Na$_2$BPA Salt Slurry in o-DCB Following the procedure described in example 3, 5.409 g m-PD (0.05 moles, 1.0 equiv.) and 18.329 g 3ClPA (0.1004 moles, 2.008 equiv.) were used to synthesize 3ClPAMI with 3ClPA and monoamine residues respectively 0.74 and 0.31 mol %. To the stirring slurry of 3ClPAMI, Na$_2$BPA salt slurry (94.65 g, 13.95% solid in o-DCB, 0.0485 moles, 0.97 equiv.) was added. GPC analysis with polystyrene standard showed the Mw plateau of 59766 D in 15 hours with PDI 2.80. The polymer was isolated as described in example 3. The cyclics (n=1) in this case was 0.35% with respect to the polymer area in the GPC. The polymer had a Tg of 237° C. and 437 ppm OH end groups.

Example 10—Synthesis of PEI from Polymerization of 3ClPAPI Derived from 3ClPA and Paraphenylene Diamine (pPD) in DPS Using Na$_2$BPA Salt Slurry in o-DCB Following the procedure described in example 3, 5.409 g pPD (0.05 moles, 1.0 equiv.) and 18.329 g 3ClPA (0.1004 moles, 2.008 equiv.) were used to synthesize 3ClPAPI with 3ClPA and monoamine residues respectively 0.67 and 0.22 mol %. To the stirring slurry of 3ClPAPI, Na$_2$BPA salt slurry (96.38 g, 13.7% solid in o-DCB, 0.0485 moles, 0.97 equiv.) was added. GPC analysis with polystyrene standard showed the Mw plateau of 48235 D in 14 hours with PDI 2.55. The polymer was isolated as described in example 5. The Tg of the polymer was 244° C.

Example 11—Synthesis of PEI from Polymerization of 4ClPAPI Derived from 4ClPA and Paraphenylene Diamine (pPD) in DPS Using Na$_2$BPA Salt Slurry in o-DCB Following the procedure described in example 3, 5.409 g pPD (0.05 moles, 1.0 equiv.) and 18.329 g 4ClPA (0.1004 moles, 2.008 equiv.) were used to synthesize 4ClPAPI with 4ClPA and monoamine residues respectively 0.55 and 0.9 mol %. To the stirring slurry of 4ClPAPI, Na$_2$BPA salt slurry (97.37 g, 13.7% solid in o-DCB, 0.049 moles, 0.98 equiv.) was added. GPC analysis with polystyrene standard showed the Mw plateau of 67171 D in 4 hours with PDI 2.67. The polymer was isolated as described in example 6 and had a Tg of 226° C. and 40 ppm sodium ions.

Example 12—Synthesis of PEI from Polymerization of 3ClPAMIDPE Derived from 3ClPA and Oxydianiline (ODA) in DPS Using Na$_2$BPA Salt Slurry in o-DCB Following the procedure described in example 3, 10.012 g ODA (0.05 moles, 1.0 equiv.) and 18.329 g 3ClPA (0.1004 moles, 2.008 equiv.) were used to synthesize 3ClPAMIDPE. To the stirring slurry of 3ClPAMIDPE, Na$_2$BPA salt slurry (96.38 g, 13.7% solid in o-DCB, 0.0485 moles, 0.97 equiv.) was added. GPC analysis with polystyrene standard showed the Mw plateau of 66581 D in 6 hours with PDI 2.31. The polymer was isolated as described in example 3 and was characterized as follows: Tg, 234° C.; OH, 422 ppm; and YI, 178.

Example 13—Synthesis of PEI from Polymerization of 4ClPAMIDPE Derived from 4ClPA and Oxydianiline (ODA) in DPS Using Na$_2$BPA Salt Slurry in o-DCB Following the procedure described in example 3, 10.012 g ODA (0.05 moles, 1.0 equiv.) and 18.329 g 4ClPA (0.1004 moles, 2.008 equiv.) were used to synthesize 4ClPAMIDPE. To the stirring slurry of 4ClPAMIDPE, Na$_2$BPA salt slurry (96.38 g, 13.7% solid in o-DCB, 0.0485 moles, 0.97 equiv.) was added. GPC analysis with polystyrene standard showed the Mw plateau of 69673 D in 23 hours with PDI 2.42. The polymer was isolated as described in example 4.

Example 14—Synthesis of PEI from Polymerization of 3ClPAMIDPS Derived from 3ClPA and 4,4'-Diaminodiphenyl Sulfone (DDS) in DPS Using Na$_2$BPA Salt Slurry in o-DCB Following the procedure described in example 3, 12.415 g 4,4'-diaminodiphenyl sulfone, DDS (0.05 moles, 1.0 equiv.) and 18.329 g 3ClPA (0.1004 moles, 2.008 equiv.) were used to synthesize 3ClPAPIDPS. To the stirring slurry of 3ClPAMIDPS, Na$_2$BPA salt slurry (88.04 g, 15.0% solid in o-DCB, 0.0485 moles, 0.97 equiv.) was added. GPC analysis with polystyrene standard showed the Mw plateau of 45643 D in 23 hours with PDI 2.12. The polymer was isolated as described in example 6 and had 505 ppm OH end group 505 ppm and 10 ppm sodium ion.

Example 15—Synthesis of PEI from Polymerization of 4ClPAMIDPS Derived from 4ClPA and 4,4'-Diaminodiphenyl Sulfone (DDS) in DPS Using Na$_2$BPA Salt Slurry in o-DCB Following the procedure described in example 3, 12.415 g 4,4'-diaminodiphenyl sulfone, DDS (0.05 moles, 1.0 equiv.) and 18.329 g 4ClPA (0.1004 moles, 2.008 equiv.) were used to synthesize 4ClPAMIDPS. To the stirring slurry of 4ClPAMIDPS, Na$_2$BPA salt slurry (88.04 g, 15.0% solid in o-DCB, 0.0485 moles, 0.97 equiv.), was added. GPC analysis with polystyrene standard showed the Mw plateau of 41799 D in 16 hours with PDI 2.22. The polymer was isolated as described in example 4.

Example 16—Synthesis of PEI from Polymerization of 4ClPAMI Derived from 4ClPA and Meta-Phenylene Diamine (mPD) in Sulfolane Using Na$_2$BPA Salt Slurry in o-DCB A 500 mL 3-neck round bottomed flask (24/40) was equipped with an overhead stirrer. The flask was also connected to a nitrogen sweep and a nitrogen blanket. The nitrogen blanket was connected to a bubbler via a Dean-Stark trap with its arm wrapped in a heating tape. The flask was charged with 5.409 g m-PD (0.05 moles, 1.0 equiv.) and 18.329 g 4ClPA (0.1004 moles, 2.008 equiv.) followed by the addition of warm sulfolane (making it ~18% solid) at 170° C. and the temperature was slowly increased to 200° C. The initial solution converted into a thick white slurry of 4ClPAMI in sulfolane. The heating was continued for 4 h and the slurry became slightly thinner. At that point, the stoichiometry analysis of the reaction mixture showed the presence of 0.82 mol % of residual 4ClPA and 0.94 mol % of residual monoamine in the reaction mixture.

To the stirring slurry of 4ClPAMI, Na$_2$BPA salt slurry (97.37 g, 13.7% solid in o-DCB, 0.049 moles, 0.98 equiv.)

was added. The temperature of the reaction mixture was increased from 170° C. to 200° C. The heating tape on the arm of the Dean-Stark trap was turned on and the o-DCB was stripped off the reaction mixture with the help of nitrogen sweep. GPC analysis with polystyrene standard showed the Mw plateau of 51204 D in 12 hours with PDI 2.91. The polymer was isolated as described in example 3. The polymer contained 19 ppm sodium ion and had a Tg of 219° C.

Example 17—Synthesis of PEI from Polymerization of 3ClPAMI Derived from 3ClPA and Meta-Phenylene Diamine (mPD) in Sulfolane Using Na$_2$BPA Salt Slurry in o-DCB Following the procedure described in example 16, 5.409 g m-PD (0.05 moles, 1.0 equiv.) and 18.329 g 3-ClPA (0.1004 moles, 2.008 equiv.) were used to synthesize 3ClPAMI. To the stirring slurry of 3ClPAMI, Na$_2$BPA salt slurry (97.37 g, 13.7% solid in o-DCB, 0.049 moles, 0.98 equiv.) was added. GPC analysis with polystyrene standard showed the Mw plateau of 45150 D in 8 hours with PDI 2.4. The polymer contained 0.7% cyclic (n=1) based on the area under the curve in GPC. The polymer was isolated as described in example 3. The polymer contained 788 ppm Na ion and had the following properties: Tg 234° C. and YI 244.

Example 18—Synthesis of PEI from Polymerization of 3ClPAMI Derived from 3ClPA and Paraphenylene Diamine (pPD) in Sulfolane Using Na$_2$BPA Salt Slurry in o-DCB Following the procedure described in example 16, 5.409 g pPD (0.05 moles, 1.0 equiv.) and 18.329 g 3ClPA (0.1004 moles, 2.008 equiv.) were used to synthesize 3ClPAPI. To the stirring slurry of 3ClPAPI, Na$_2$BPA salt slurry (97.37 g, 13.7% solid in o-DCB, 0.049 moles, 0.98 equiv.) was added. GPC analysis with polystyrene standard showed the Mw plateau of 42773 D in 11 hours with PDI 2.62. The polymer was isolated as described in example 6. The polymer contained 110 ppm of sodium ion and had a Tg of 226° C.

Example 19—Synthesis of PEI from Polymerization of 3ClPAMIDPE Derived from 3ClPA and 4,4'-Oxydianiline (ODA) in Sulfolane Using Na$_2$BPA Salt Slurry in o-DCB Following the procedure described in example 16, 10.02 g 4,4'-ODA (0.05 moles, 1.0 equiv.) and 18.329 g 3ClPA (0.1004 moles, 2.008 equiv.) were used to synthesize 3ClPAMIDPE. To the stirring slurry of 3ClPAMIDPE, Na$_2$BPA salt slurry (96.38 g, 13.7% solid in o-DCB, 0.0485 moles, 0.97 equiv.) was added. GPC analysis with polystyrene standard showed the Mw plateau of 51843 D in 10 hours with PDI 2.39. The polymer was isolated as described in example 6.

Example 20—Synthesis of PEI from Polymerization of 4ClPAMIDPE Derived from 4ClPA and 4,4'-Oxydianiline (ODA) in Sulfolane Using Na$_2$BPA Salt Slurry in o-DCB Following the procedure described in example 16, 10.02 g 4,4'-ODA (0.05 moles, 1.0 equiv.) and 18.329 g 4ClPA (0.1004 moles, 2.008 equiv.) were used to synthesize 4ClPAMIDPS. To the stirring slurry of 4ClPAMIDPS, Na$_2$BPA salt slurry (96.38 g, 13.7% solid in o-DCB, 0.0485 moles, 0.97 equiv.) was added. GPC analysis with polystyrene standard showed the Mw plateau of 49547 D in 10 hours with PDI 2.27. The polymer was isolated as described in example 6. The OH end groups were 684 ppm.

Example 21—Synthesis of PEI from Polymerization of 4,4'-Bis[N-(3,4-Chlorophthalimido)]Diphenyl Ether (3,4ClPAMIDPE) Derived from 30:70 Mixture of 3 and 4-Chlorophthalic Anhydride (3/4ClPA) and 4,4'-Oxydianiline (ODA) in Sulfolane Using Na$_2$BPA Salt Slurry in o-DCB Following the procedure described in example 16, 10.02 g 4,4'-ODA (0.05 moles, 1.0 equiv.), 12.779 g 4ClPA (0.07 moles, 1.4 equiv.) and 5.477 g 3ClPA (0.03 moles, 0.6 equiv) were used to synthesize 3,4'-ClPAMIDPE. To the stirring slurry of 3,4'-ClPAMIDPE, Na$_2$BPA salt slurry (96.38 g, 13.7% solid in o-DCB, 0.0485 moles, 0.97 equiv.) was added. GPC analysis with polystyrene standard showed the Mw plateau of 52259 D in 8 hours with PDI 2.23. The polymer was isolated as described in example 6. The polymer contained 642 ppm sodium ion and 586 ppm OH end groups. The Tg of the polymer was 223° C.

Example 22—Synthesis of PEI from Polymerization of 1,3-Bis[N-(3,4-Chlorophthalimido)]Benzene (3,4ClPAMI) Derived from Mixture of 3 and 4-Chlorophthalic Anhydride (3/4ClPA) and Meta-phenylene Diamine (mPD) in Sulfolane Using Na$_2$BPA Salt Slurry in o-DCB Following the procedure described in example 16, 5.409 g mPD (0.05 moles, 1.0 equiv.), 12.779 g 4ClPA (0.07 moles, 1.4 equiv.) and 5.477 g 3ClPA (0.03 moles, 0.6 equiv) were used to synthesize 3,4'-ClPAMI. To the stirring slurry of 3,4'-ClPAMI, Na$_2$BPA salt slurry (96.38 g, 13.7% solid in o-DCB, 0.0485 moles, 0.97 equiv.) was added. GPC analysis with polystyrene standard showed the Mw plateau of 48720 D in 11 hours with PDI 2.44. The polymer was isolated as described in example 6. The polymer contained 585 ppm sodium ions and had a Tg of 220° C.

Example 23—Synthesis of PEI from Polymerization of 3ClPAMIDPE Derived from 3ClPA and 4,4'-Oxydianiline (ODA) in Sulfolane Using Na$_2$BPA Salt Slurry in Made in Sulfolane A 1000 mL 3-neck round bottomed flask (24/40) was equipped with an overhead stirrer. The flask was also connected to a nitrogen sweep and a nitrogen blanket. The nitrogen blanket was connected to a bubbler via a Dean-Stark trap with its arm wrapped in a heating tape. The flask was then charged with 93.1035 g biphenol (BP) (0.5 moles, 1 equiv.) and 1.0 moles aqueous NaOH solution. The overhead stirrer was turned on and the flask was immersed into the oil bath at 100° C. The stirring was continued for 1 h. To the aqueous solution of Na$_2$BPA at 100° C., 500 mL warm Sulfolane was added under nitrogen atmosphere and the mixture was heated slowly to 170° C. while stirring stripping off water and sulfolane mixture. The mixture becomes soluble at 130° C. and starts becoming white slurry after the removal of significant amount of water. Additional 300 mL sulfolane was used while stripping off the water to ensure the complete removal of water. The salt was used for the polymerization.

Following the procedure described in example 16, 10.02 g 4,4'-ODA (0.05 moles, 1.0 equiv.) and 18.329 g 3ClPA (0.1004 moles, 2.008 equiv.) were used to synthesize 3ClPAMIDPE. To the stirring slurry of 3ClPAMIDPE, solid Na₂BPA salt slurry (80.56 g, 14% solid in sulfolane, 0.049 moles, 0.98 equiv.) synthesized as described above, was added. GPC analysis with polystyrene standard showed the Mw plateau of 51393 D in 6 hours with PDI 2.32. The polymer was isolated as described in example 6.

Example 24—Synthesis of PEI from Polymerization of 3ClPAMIDPE Derived from 3ClPA and 4,4'-Oxydianiline (ODA) in DPS Using Na₂BPA Salt Slurry Made in o-DCB A 500 mL 3-neck round bottomed flask (24/40) was equipped with an overhead stirrer. The flask was also connected to a nitrogen sweep and a nitrogen blanket. The nitrogen blanket was connected to a bubbler via a Dean-Stark trap with its arm wrapped in a heating tape. The flask was then charged with 46.55 g BP (0.25 moles, 1 equiv.) and 0.5 moles aqueous NaOH solution. 100 mL water and 300 mL methanol were added to the mixture to make the mixture soluble. The overhead stirrer was turned on and the flask was immersed into the oil bath at 70° C. The stirring was continued for 1 h. Another 1000 mL 3-neck flask with the above set-up was charged with 500 mL o-DCB and heated to 140° C. The aqueous/methanol salt solution was slowly cannulated into the flask with o-DCB. The azeotropic mixture of water, methanol, and o-DCB was collected into the Dean-Stark with the nitrogen sweep while the salt slurry was forming. Removal of water and oDCB continued until the Karl-Fisher analysis of the overhead condensate showed the moisture level <50 ppm.

Following the procedure described in example 3, 10.02 g 4,4'-ODA (0.05 moles, 1.0 equiv.) and 18.329 g 3ClPA (0.1004 moles, 2.008 equiv.) were used to synthesize 3ClPAMIDPE. To the stirring slurry of 3ClPAMIDPE, solid Na₂BPA salt slurry (112.78 g, 10% solid in oDCB, 0.049 moles, 0.98 equiv.) synthesized as described above, was added. GPC analysis with polystyrene standard showed the Mw plateau of 59373 D in 13 hours with PDI 2.25. The polymer was isolated as described in example 6.

Example 25—Synthesis of PEI from Polymerization of 4ClPAMI Derived from 4ClPA and Metaphenylene Diamine (mPD) in NMP Using Na₂BPA Salt Slurry in Toluene Following the procedure described in example 3, 5.409 g m-PD (0.05 moles, 1.0 equiv.) and 18.329 g 4ClPA (0.1004 moles, 2.008 equiv.) were used to synthesize 4ClPAMI. The reaction leaves large amount of unreacted 4ClPA and monoamine residues even after 24 h. To the stirring slurry of ClPAMI, Na₂BPA salt slurry (87.79 g, 15.04% solid in toluene, 0.0485 moles, 0.97 equiv.) in toluene was added. The mixture turned red and eventually dark red in 3 h. GPC analysis with polystyrene standard showed the Mw plateau of 11010 Dalton in 8 hours with PDI 1.96.

Further included in this disclosure are the following specific embodiments, which do not necessarily limit the claims.

Embodiment 1

A method for the manufacture of a polyetherimide composition, the method comprising contacting a substituted phthalic anhydride and an organic diamine in the presence of diphenyl sulfone or sulfolane or a combination comprising at least one of the foregoing solvents at a temperature of greater than 130° C., wherein the substituted phthalic anhydride has a formula (7), and the organic diamine has a formula H₂N—R—NH₂ to provide a bis(phthalimide) composition comprising diphenyl sulfone or sulfolane or a combination comprising at least one of the foregoing solvent and a bis(phthalimide) of the formula (9) and polymerizing the bis(phthalimide) and an alkali metal salt of a dihydroxy aromatic compound of the formula MO—Z—OM in the presence of diphenyl sulfone or sulfolane or a combination comprising at least one of the foregoing solvents to form a polyetherimide of the formula (1) wherein in the foregoing formulae X is fluoro, chloro, bromo, iodo, nitro, or a combination comprising at least one of the foregoing; R is an aromatic hydrocarbon group having 6 to 27 carbon atoms, a halogenated derivative thereof, a straight or branched chain alkylene group having 2 to 10 carbon atoms, a halogenated derivative thereof, a cycloalkylene group having 3 to 20 carbon atoms, a halogenated derivative thereof, —(C₆H₁₀)$_z$— wherein z is an integer from 1 to 4, an aromatic hydrocarbyl moiety having from 1 to 6 aromatic groups, and a divalent group of formula (2) wherein $Q^1$ is —O—, —S—, —C(O)—, —SO₂—, —SO—, —C$_y$H$_{2y}$— wherein y is an integer from 1 to 5, or a combination comprising at least one of the foregoing; M is an alkali metal; Z is an aromatic C$_{6-24}$ monocyclic or polycyclic moiety optionally substituted with 1 to 6 C$_{1-8}$ alkyl groups, 1 to 8 halogen atoms, or a combination comprising at least one of the foregoing; and n is an integer greater than 1.

Embodiment 2

The method of embodiment 1, wherein the stoichiometric ratio of the substituted phthalic anhydride to the organic diamine is 1.95:1 to 2.05:1, and the stoichiometric ratio of the bis(phthalimide) to the alkali metal salt of the dihydroxy aromatic compound is 0.9:1 to 1.1:1.

Embodiment 3

The method of Embodiment 1 or Embodiment 2, wherein $$\frac{\text{weight of bis(phthalimide)}}{\text{weight of bis(phthalimide) + weight of diphenyl sulphone or sulfolane}} (100)$$

is 1 to 30%, specifically 15 to 25%, preferably 18 to 22%.

Embodiment 4

The method of any one or more of Embodiments 1 to 3, further comprising determining the stoichiometric molar ratio of the substituted phthalic anhydride to the organic diamine during the imidization of the substituted phthalic anhydride and the organic diamine; and optionally adjusting the stoichiometric molar ratio by adding additional substituted phthalic anhydride or organic diamine.

Embodiment 5

The method of any one or more of Embodiments 1 to 4, further comprising heating the diphenyl sulfone to a temperature of greater than 130° C., and combining the substituted phthalic anhydride and the organic diamine with the heated diphenyl sulfone.

Embodiment 6

The method of any one or more of Embodiments 1 to 5, further comprising adding a monofunctional reactant to the substituted phthalic anhydride, the organic diamine, the diphenyl sulfone, sulfolane, or a combination comprising at least one of the foregoing.

Embodiment 7

The method of any one or more of Embodiments 1 to 6, wherein the contacting is conducted at a temperature of 130° C. to 250° C.

Embodiment 8

The method of any one or more of Embodiments 1 to 7, wherein the contacting is conducted in the absence of an imidization catalyst.

Embodiment 9

The method of any one or more of Embodiments 1 to 8, wherein the polymerization is conducted in the absence of a polymerization catalyst.

Embodiment 10

The method of any one or more of Embodiments 1 to 8, wherein the polymerization is conducted in the presence of a polymerization catalyst.

Embodiment 11

The method of any one or more of Embodiments 1 to 10, wherein X is chloro, fluoro, bromo, or nitro, and R is —$(C_6H_{10})_z$— wherein z is an integer from 1 to 4, or a divalent group of formulae (3) or a combination comprising at least one of the foregoing, wherein $Q^1$ is a single bond, —O—, —S—, —C(O)—, —$SO_2$—, —SO—, —$C_yH_{2y}$— wherein y is an integer from 1 to 5, or a combination comprising at least one of the foregoing.

Embodiment 12

The method of any one or more of Embodiments 1 to 11, wherein X is chloro and R is m-phenylene, p-phenylene, an arylene ether, a diarylsulfone, a group of the formula (3a) wherein $Q^1$- is a single bond, —O—, —S—, —C(O)—, —$SO_2$—, —SO—, —$C_yH_{2y}$, wherein y is an integer from 1 to 5, or a combination comprising at least one of the foregoing, preferably wherein R is m-phenylene, p-phenylene, para, para-diphenyl ether, 4,4-diphenylsulfone, or a combination comprising at least one of the foregoing.

Embodiment 13

The method of any one or more of Embodiments 1 to 12, wherein the dihydroxy aromatic compound comprises bisphenol A, hydroquinone, biphenol, resorcinol, or a combination comprising at least one of the foregoing.

Embodiment 14

The method of any one or more of Embodiments 1 to 13, wherein the dihydroxy aromatic compound is in a powder form or in a slurry form.

Embodiment 15

The method of any one or more of Embodiments 1 to 14, wherein the dihydroxy aromatic compound is dispersed in a solvent comprising ortho-dichlorobenzene, xylenes, toluene, diphenyl sulfone, sulfolane, or a combination comprising at least one of the foregoing.

Embodiment 16

The method of any one or more of Embodiments 1 to 15, wherein the dihydroxy aromatic compound is dispersed in ortho-dichlorobenzene.

Embodiment 17

The method of any one or more of Embodiments 1 to 16, wherein the bis(phthalimide) composition and the polyetherimide composition are manufactured in the same vessel.

Embodiment 18

A method for the manufacture of a polyetherimide composition, the method comprising contacting a substituted phthalic anhydride and an organic diamine in the presence of diphenyl sulfone, sulfolane, or a combination comprising at least one of the foregoing solvents at a temperature of 130° C. to 250° C., wherein the substituted phthalic anhydride has a formula (7), and the organic diamine has a formula $H_2N$—R—$NH_2$ to provide a bis(phthalimide) composition comprising diphenyl sulfone, sulfolane, or a combination comprising at least one of the foregoing solvents and a bis(phthalimide) of the formula (9) and polymerizing the bis(phthalimide) and a sodium salt of a potassium salt of bisphenol A in the presence of diphenyl sulfone, sulfolane, or a combination comprising at least one of the foregoing solvents to form a polyetherimide of the formula (1) wherein in the foregoing formulae X is chloro; R is m-phenylene, p-phenylene, p,p-diphenylether, or 4,4'-diphenylsulfone; Z is of formula (4b); and n is an integer greater than 1.

Embodiment 19

A polyetherimide composition manufactured by a method of any one of Embodiments 1 to 18.

Embodiment 20

A polyetherimide composition wherein the polyetherimide has a structure of the formula (1) wherein R is an aromatic hydrocarbon group having 6 to 27 carbon atoms, a halogenated derivative thereof, a straight or branched chain alkylene group having 2 to 10 carbon atoms, a halogenated derivative thereof, a cycloalkylene group having 3 to 20 carbon atoms, a halogenated derivative thereof, —$(C_6H_{10})_z$— wherein z is an integer from 1 to 4, an aromatic hydrocarbyl moiety having from 1 to 6 aromatic groups, and a divalent group of the formula (2) wherein $Q^1$ is —O—, —S—, —C(O)—, —$SO_2$—, —SO—, —$C_yH_{2y}$— wherein y is an integer from 1 to 5, or a combination comprising at least one of the foregoing; and Z is an aromatic $C_{6-24}$ monocyclic or polycyclic moiety optionally substituted with 1 to 6 $C_{1-8}$ alkyl groups, 1 to 8 halogen atoms, or a combination comprising at least one of the foregoing; and n is an integer greater than 1; preferably wherein R is m-phenylene, p-phenylene, p,p-diphenylether, or 4,4'-diphenylsulfone; Z is formula (4b); and n is an integer from 10 to 50; and wherein the composition comprises one or more of greater than 0.1 parts per million of diphenyl sulfone, sulfolane, or a combination comprising at least one of the foregoing, or greater than 1 part per million of sodium or potassium, or a yellowness index of less than 300.

The singular forms "a," "an," and "the" include plural referents unless the context clearly dictates otherwise. "Or" means "and/or." The endpoints of all ranges directed to the same component or property are inclusive and independently combinable. Unless defined otherwise, technical and scientific terms used herein have the same meaning as is commonly understood by one of skill in the art to which this invention belongs. As used herein, a "combination" is inclusive of blends, mixtures, alloys, reaction products, and the like.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group.

All references cited herein are incorporated by reference in their entirety.

While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. A polyetherimide composition wherein the polyetherimide has a structure of the formula

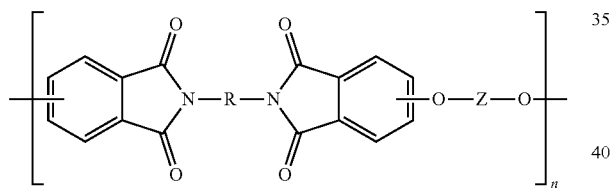

wherein
R is an aromatic hydrocarbon group having 6 to 27 carbon atoms, a halogenated derivative thereof, a straight or branched chain alkylene group having 2 to 10 carbon atoms, a halogenated derivative thereof, a cycloalkylene group having 3 to 20 carbon atoms, a halogenated derivative thereof, —(C$_6$H$_{10}$)$_z$— wherein z is an integer from 1 to 4, an aromatic hydrocarbyl moiety having from 1 to 6 aromatic groups, and a divalent group of the formula

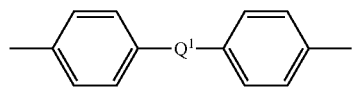

wherein Q$^1$ is —O—, —S—, —C(O)—, —SO$_2$—, —SO—, —C$_y$H$_{2y}$— wherein y is an integer from 1 to 5, or a combination comprising at least one of the foregoing; and
Z is an aromatic C$_{6-24}$ monocyclic or polycyclic moiety optionally substituted with 1 to 6 C$_{1-8}$ alkyl groups, 1 to 8 halogen atoms, or a combination comprising at least one of the foregoing; and
n is an integer greater than 1; and wherein
the composition comprises greater than 0.1 parts per million of sulfolane and 19 to 10,000 parts per million of sodium or potassium, each based on the total weight of the composition.

2. The polyetherimide composition of claim 1, having a yellowness index of less than 300.

3. The polyetherimide composition of claim 1, wherein the polyetherimide composition is free of an imidization catalyst.

4. The polyetherimide composition of claim 1, wherein the polyetherimide composition is free of a polymerization catalyst.

5. The polyetherimide composition of claim 1, wherein
R is a divalent radical of the formula —(C$_6$H$_{10}$)$_z$— wherein z is an integer from 1 to 4,

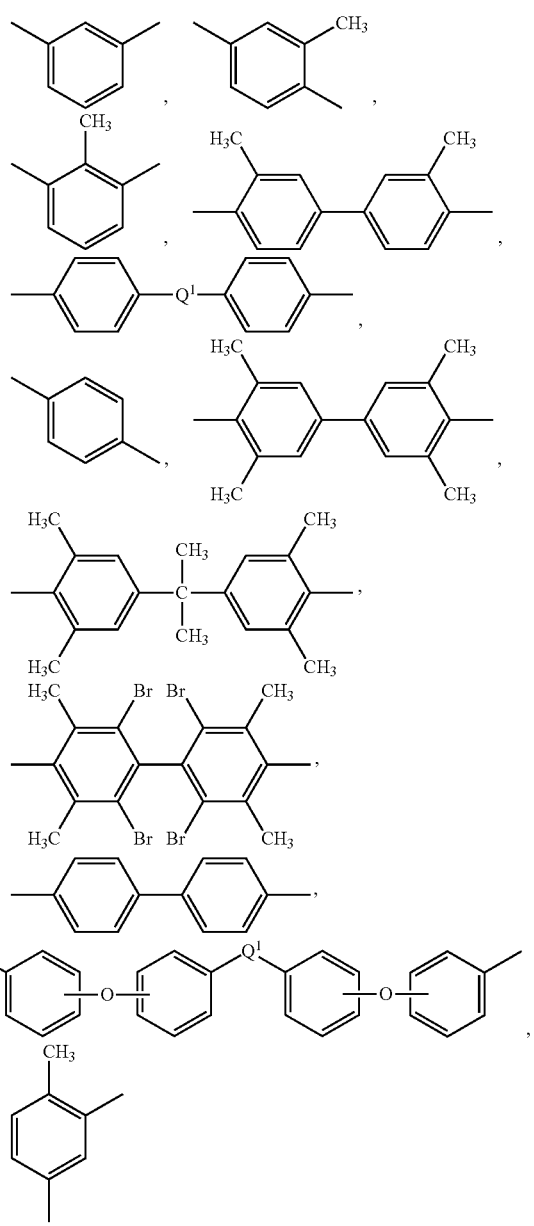

or a combination comprising at least one of the foregoing, wherein $Q^1$ is a single bond, —O—, —S—, —C(O)—, —SO$_2$—, —SO—, —C$_y$H$_{2y}$— wherein y is an integer from 1 to 5, or a combination comprising at least one of the foregoing.

6. The polyetherimide composition of claim 1, wherein R is m-phenylene, p-phenylene, an arylene ether, a diarylsulfone, a group of the formula

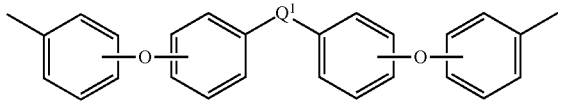

wherein $Q^1$ is a single bond, —O—, —S—, —C(O)—, —SO$_2$—, —SO—, —C$_y$H$_{2y}$ wherein y is an integer from 1 to 5, or a combination comprising at least one of the foregoing.

7. The polyetherimide composition of claim 1, wherein the polyetherimide is derived from a polydihydroxy aromatic compound comprising bisphenol A, hydroquinone, biphenol, resorcinol, or a combination comprising at least one of the foregoing.

8. The polyetherimide composition of claim 1, comprising greater than 1 to 1,000 parts per million of sulfolane.

9. The polyetherimide composition of claim 1, comprising 19 to 1,000 parts per million of sodium or potassium, each based on the total weight of the composition.

10. The polyetherimide composition of claim 1, wherein the polyetherimide composition comprises a solvent, and the composition is in the form of a varnish.

11. The polyetherimide composition of claim 1, further comprising a heat stabilizer, a mold release agent, or a combination comprising at least one of the foregoing.

12. The polyetherimide composition of claim 1, further comprising at least one additional polymer, the additional polymer comprising polyphenylene sulfone, polysulfone, polyphenylene ether, perfluoroalkoxy alkane, co-polymer of tetrafluoroethylene and perfluorinated vinyl ether, fluorinated ethylene propylene polymers, poly(phenylene sulfide, polytetrafluoroethylene, polyamide, polybenzimidizole, poly(amide-imide), poly(ether sulfone), poly(aryl sulfone), polyphenylene, polybenzoxazoles, polybenzthiazoles, or a combination comprising at least one of the foregoing.

13. The polyetherimide composition of claim 12, wherein the additional polymer is present in an amount of 0.1 to 15 wt. % based on the total weight of the polyetherimide composition.

14. The polyetherimide composition of claim 1, wherein the composition comprises 40 to 10,000 parts per million of sodium or potassium, each based on the total weight of the composition.

15. The polyetherimide composition of claim 1, wherein the composition comprises 50 to 10,000 parts per million of sodium or potassium, each based on the total weight of the composition.

* * * * *